Oct. 14, 1924.
W. M. STIDWORTHY
1,511,687
GLARESHIELD FOR WINDSHIELDS
Filed June 13, 1923
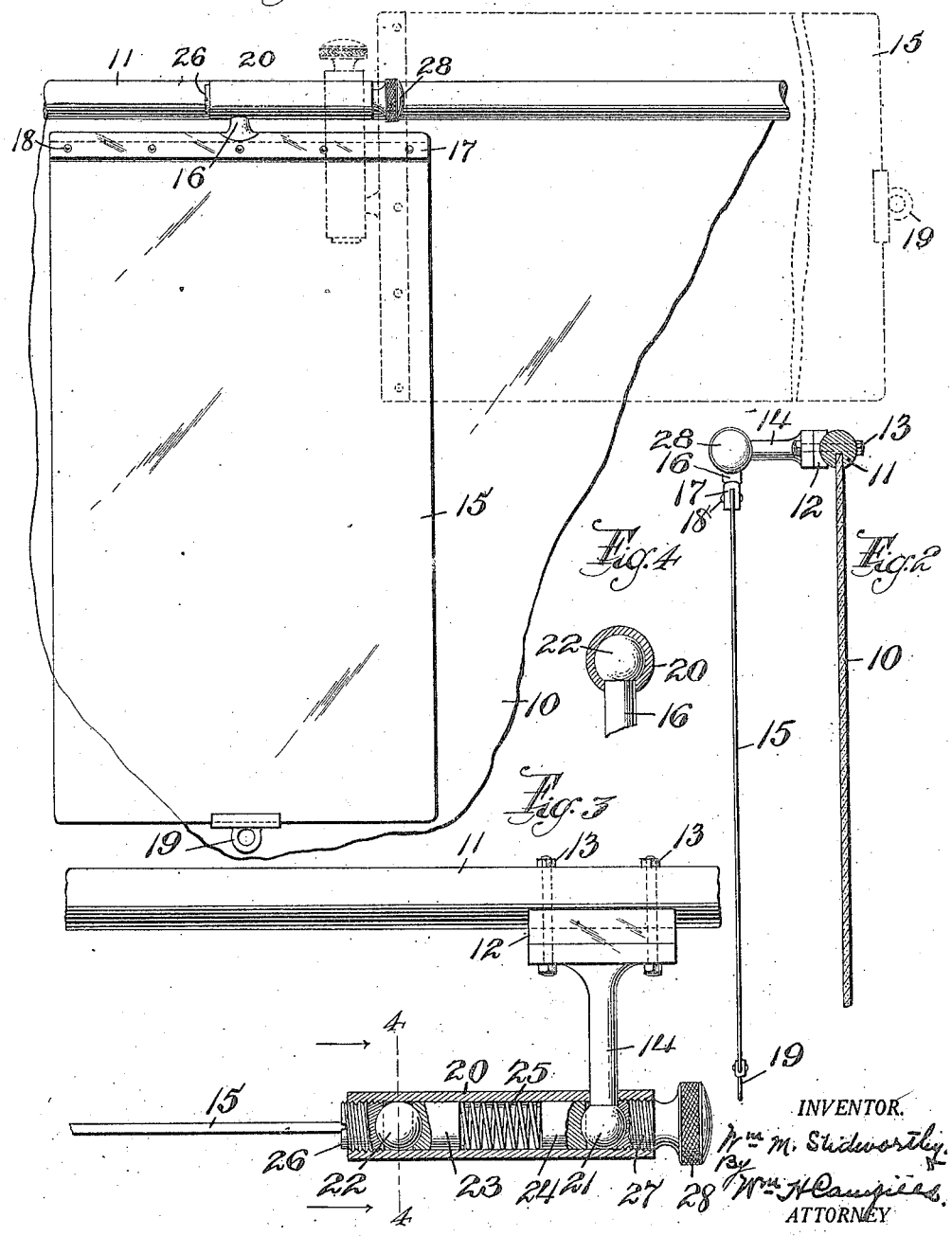

Patented Oct. 14, 1924.

1,511,687

UNITED STATES PATENT OFFICE.

WILLIAM M. STIDWORTHY, OF HACKETTSTOWN, NEW JERSEY.

GLARESHIELD FOR WINDSHIELDS.

Application filed June 13, 1923. Serial No. 645,015.

*To all whom it may concern:*

Be it known that I, WILLIAM M. STIDWORTHY, a citizen of the United States, and a resident of Hackettstown, county of Warren, and State of New Jersey, have invented certain new and useful Improvements in Glareshields for Windshields, of which the following is a specification.

This invention relates to a shield to be used for shading any place or person, and its particular application is for use on automobiles, usually on or just behind the wind shield.

The invention comprises an opaque or translucent plate which is mounted so that it is easily adjusted as a shield against the sun or approaching headlights, and can also be raised and tilted to be used as a sun shade.

The invention also resides in certain details of construction to be hereinafter more fully described and finally embodied in the claims.

The invention is illustrated in the accompanying drawing, in which I show one embodiment, and in which Figure 1 is a front view showing part of the wind shield on which the device is mounted. Figure 2 is an edge view thereof with the wind shield shown in section. Figure 3 is a top view on a slightly enlarged scale, with a connection between two studs shown in section, and Figure 4 is a section taken on line 4—4 in Figure 3.

The device is suitably supported on the top rail of a wind shield, or in case of a coupé or sedan on the inside of the front part of the top, but I illustrate in the drawing a wind shield 10, to the top rail 11 of which the device is secured by means of a bracket 12 held by the small bolts 13. From the bracket projects a stud 14 which I call the supporting stud. The shield or plate 15 is normally suspended in rear of the wind shield and can be made either opaque or translucent, the latter being preferred, and is sometimes made of glass, but celluloid is usually used on account of its lightness and because it is not brittle. The plate 15 has at the top a stud 16 which can be suitably secured thereto, usually by providing the stud with a clip 17 split to receive the top edge of the plate 15, which is held thereon by rivets 18. Any suitable finger-piece 19 is attached to the bottom of the plate so that it can be handled without getting the plate greasy or full of finger marks.

To permit various positions of the plate 15, I place a connection between the two studs 14 and 16, this connection being mounted on the studs so that the studs can rotate relative to the connection, each on its own axis, it being understood, however, that when the stud 14 is fastened on the wind shield of the car, the sleeve rotates on the stud, but for the purpose of description these relative rotations are set forth by describing the stud as rotative relative to the connection.

In the form shown this connection comprises a sleeve 20, into which the studs pass laterally, that is, perpendicular to the axis of the sleeve and preferably at right angles to each other. The studs are preferably headed, the stud 14 having a head 21, and the stud 16 having a head 22. It will be seen from Figure 4 that these studs can not swing relative to the sleeve or connection 20, but are only rotatable.

Suitable friction means are arranged to hold the parts in adjusted positions, and the form shown includes the blocks 23 and 24, recessed to bear against the heads 21 and 22, respectively, and having the spring 25 between the blocks to yieldingly press them in contact with the studs.

Suitable abutments are provided, these being preferably adjustable, and I show one in the form of a screw plug 26 which is usually arranged so that it can be operated only by a screw-driver or similar tool, the adjustment of this one being only sufficient to hold the plate 15 in tilted position relative to the connection or sleeve 20, the other one, however, being in the form of a screw plug 27 which has a suitable finger-piece or handle 28 so that it can be tightly screwed in to hold the sleeve against any movement on the stud, so that the connection and its plate are maintained in horizontal or tilted position without undue vibration, and without dropping down from the horizontal or tilted position in which it is placed.

When the device is to be used against the sun or against headlights at night, it is suspended vertically, as shown in full lines in Figure 1. When, however, it is to be moved out of the way or used as a sun shade, it can be moved to a horizontal position, as shown in dotted outline in Figure 1, and either held parallel with the windshield 10, or it can be tilted, since the stud 16 can rotate as above described, this rotation being in a plane parallel with the axis of the connection or sleeve 20. The rotation of the stud 14, of course, in the sleeve is also parallel with the axis of the sleeve 20.

It will be evident that in cars without a top the device can also be swung to the left instead of to the right, looking at Figure 1, in this way being raised to a higher point, and when tilted to the proper angle acting as a shade to prevent the sun light interfering with the comfort of the driver.

It will be understood that miner changes can be made in the proportions and arrangements of the parts, without departing from the scope of the invention.

I claim:

1. A glare shield comprising a supporting stud, a plate, a stud on the plate, a sleeve with an opening near each end, each opening to receive one of the studs and disposed so that one stud is held at right angles to the other and friction means within the sleeve to bear on the studs and hold them yieldingly in adjusted rotative positions.

2. A glare shield comprising a headed supporting stud, a plate, a headed stud on the plate, a sleeve with openings, one near each end and at right angles to each other, whereby the studs are held against any movement except rotation, and friction means within the sleeve to hold the heads in adjusted position.

3. A glare shield comprising a headed supporting stud, a plate, a headed stud on the plate, a sleeve with openings, one near each end and at right angles to each other, whereby the studs are held against any movement except rotation, blocks in the sleeve and bearing on the heads of the studs and a spring between the blocks to cause said blocks to frictionally engage the heads to hold them in adjusted positions.

4. A glare shield comprising a headed supporting stud, a plate, a headed stud on the plate, a sleeve with openings, one near each end and at right angles to each other, whereby the studs are held against any movement except rotation, blocks in the sleeve and bearing on the heads of the studs and a spring between the blocks to cause said blocks to frictionally engage the heads to hold them in adjusted positions and adjustable abutments in the ends of the sleeve to bind the studs against rotation.

In testimony that I claim the foregoing, I have hereto set my hand, this 12th day of June, 1923.

WM. M. STIDWORTHY.